United States Patent

[11] 3,568,115

| [72] | Inventor | William Affleck Wolfe<br>Ontario, Canada |
|---|---|---|
| [21] | Appl. No. | 760,565 |
| [22] | Filed | Sept. 18, 1968 |
| [45] | Patented | Mar. 2, 1971 |
| [73] | Assignee | Atomic Energy of Canada Limited<br>Ottawa, Ontario, Canada |
| [32] | Priority | Nov. 10, 1967 |
| [33] | | Canada |
| [31] | | 004,760 |

[54] MAGNETIC MATERIAL MULTIPOLE ASSEMBLY
4 Claims, 3 Drawing Figs.

[52] U.S. Cl. .................................................... 335/210,
328/233
[51] Int. Cl. ..................................................... H01t 7/00
[50] Field of Search .......................................... 335/210,
296, 297, 302, 306; 328/233, 235

[56] References Cited
UNITED STATES PATENTS
2,883,569  4/1959  Kaiser .......................... 335/210X
OTHER REFERENCES
The Review of Scientific Instruments, Vol. 30. No. 5, May, 1959, pp. 356— 358, an article by Christensen et al. copy in 335-210

*Primary Examiner*—G. Harris
*Attorney*—James R. Hughes

ABSTRACT: A multipole magnet, for example a quadrupole magnet for an ionic beam, comprises an equal number of ferrous poles of, say, barium or strontium ferrite, and magnetic material members arranged side by side to define a central aperture. The ferrous poles and magnetic material are arranged alternately around the central aperture so that their polarities cooperate to produce a multipole magnet field.

PATENTED MAR 2 1971 3,568,115

INVENTOR
WILLIAM A. WOLFE
By
AGENT

MAGNETIC MATERIAL MULTIPOLE ASSEMBLY

This invention relates to a permanent magnet configuration and more particularly to a magnet material multipole assembly.

Multipole magnets such as quadrupole magnets are common for ionic beam transport. These usually contain poles of ferrous material surrounded by current conducting coils, usually copper, to produce the necessary magnetic fields. Hitherto permanent magnet materials have not possessed sufficient coercivity to replace coils, nor have they been manufactured in slabs large enough to provide sufficient magnetic flux over the large volumes required in high energy beam transport, that is, energies of 1 billion electron-volts or more.

J. B. Blewett, Brookhaven National Laboratories, has made quadrupole magnets from barium-ferrite rings. However he did not use iron in conjunction with the ferrite to increase the flux density in the aperture of his magnets. By the proper combination of iron and magnet material for example barium or strontium ferrite, greater freedom in design of the quadrupole is achieved and in particular the aperture through the magnet can be increased in diameter and the field gradients set by suitable proportioning of the iron and magnetic portions.

The substitution of a magnet material for an electrical coil results in power savings as all of the electrical energy supplied to the normal quadrupole is dissipated as heat. No energy is given to the ionic beam. Hence the substitution or magnet material for electrical coils makes the quadrupoles independent of electrical supply and removes entirely the heat dissipation problem.

According to the present invention there is provided a magnet material quadrupole assembly comprising four ferrous poles and four magnet material members defining an aperture in the assembly, said poles and members juxtaposed and oriented to have their polarities cooperate to produce a quadrupole magnetic field in said aperture.

The invention achieves high magnet-flux densities by suitable configurations of ferrous and magnet material. That is, the inherently low flux density in magnet material such as strontium or barium ferrite is increased by inserting ferrous material in the flux path.

Preferably the magnetic material members comprise hexagonal or circular cylinders of magnetic ferrite.

This invention further contemplates the magnet material comprise ferrites.

This invention will now be described, by way of example, reference being had to the accompanying drawings in which.

Figure 1:
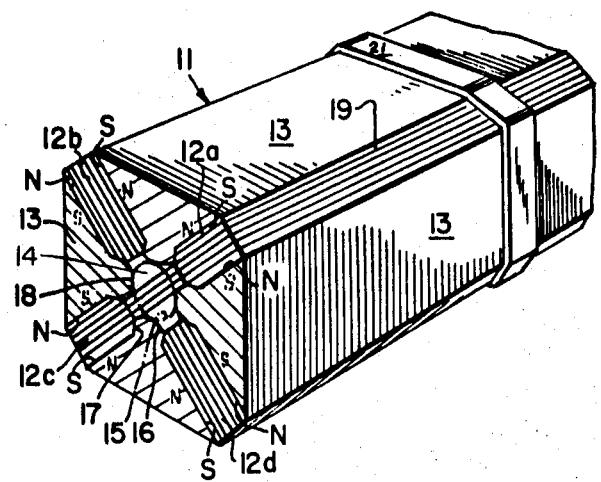
FIG. 1 is a perspective view of a cross section of an embodiment of the invention, wherein the mechanical means for holding the embodiment together has been omitted for clarity.

Referring to FIG. 1 a magnet material quadrupole assembly 11 is composed of four magnet ferrite members or magnets 12a, b, c, d, in quadrature and disposed in a media 13 of ferrous material such as soft iron. The media 13 and ferrite members 12 display an aperture or opening 14 which has a circular clearance 15 (dotted) centered on the intersecting axis of the ferrite members 12.

The media 13, preferably, sweeps back along an arcuate edge 16 between adjacent members 12, such that the arcuate edge 16 meets the circular aperture 15 tangentially at point 18. The arcuate edge 16, may, be any curve because its purpose, which is commonly known in the art is to attenuate harmonics of the sinusoidal magnetic field in the aperture 15. The ferrite member 12, preferably is tapered at 17, to a blunt head to reduce the flux losses which are greatest in air gaps at right angles to a magnetic field and least in air gaps which are parallel to a magnetic field.

A magnetic ferrite member, for example, member 12a, may include a plurality of elements in the form of juxtaposed parallel slabs 19, composed of strontium ferrite or barium ferrite. The slabs 19 are juxtaposed having their surfaces in planes parallel or perpendicular to the axis of the magnetic ferrite member. This requires that the magnet ferrite members be disposed on an axis at right angles to the axis of the magnetic ferrite slabs, that is, parallel with or at right angles to the surface of the planes of the juxtaposed slabs 19.

On the other hand, a magnetic ferrite 12a, b, c, or d may be composed of circular ferrite cylinders 37, or, hexagonal ferrite cylinders 38. Another alternative is that the magnetic ferrite member 12 be composed of a unitary slab of ferrite material.

The magnetic ferrite members 12, are arranged to have corresponding poles of adjacent members adjacent. For example, the member 12a is arranged to have its south pole adjacent to the south pole of member 12b, the adjacent magnet; while the north pole of the member 12a is adjacent to the north pole of the adjacent magnet member 12d. Similarly, it can be seen from FIG. 1, that identical poles of the members 12d, 12c, and 12b are respectively adjacent.

It can be shown, that if each magnetic member 12 is composed of barium ferrite and has dimensions of approximately 8.8cm. by 14cm. by 25cm., and the aperture 15 has a diameter of about 12.12cm., the field gradient within the aperture is approximately 6Wb/m.$^3$.

Figure 2:
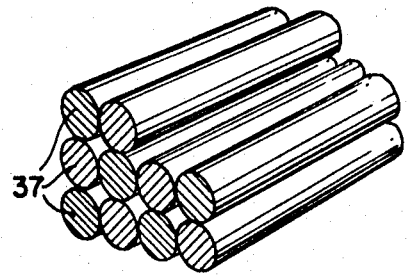
FIG. 2 is a perspective view of a part of a composite ferrite member assembled from circular ferrite cylinders.
Figure 3:
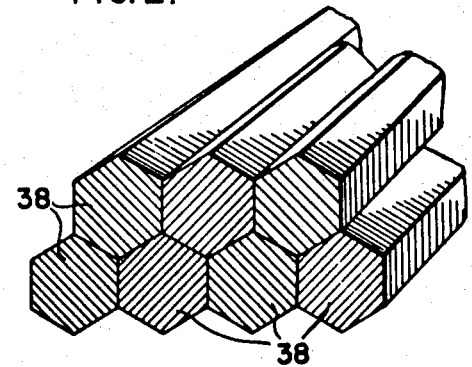
FIG. 3 is a perspective view of yet another part of a ferrite member assembled from hexagonal cylinders.

The slabs 19 may be fabricated in the following manner. An aqueous slurry of barium ferrite powder is compressed under the influence of a magnetic field in the order of 13 k. gauss into long slabs. In a different embodiment they may be formed into cylinders 37, as shown on FIG. 2; or preferably they may be compressed into hexagonal bars 38, as shown in FIG. 3. The material of the compressed ferrite is then sintered at about 1,000° C. (twice the Curie point) which converts it to a ceramic. The ceramic can then be machined by grinding lapping, or by ultrasonic methods. The ceramic may then be magnetized and then placed in a mosaic to form pole members 12. The contraction 20 of the slurry to the ceramic is approximately two, that is, to produce a 10cm. long barium ferrite magnet, one begins with the slurry of about 20 cm. long. Preferably the ferrite particles should be less than 1 micron in size.

It will now be apparent to those skilled in the art, that poles of the magnets 12 induce in the ferrous media 13 poles of opposite polarity thereto. As a result the assembly 11 is self-binding. That is, the assembly is held together by its own magnetic forces, which urge media 13 and the magnets 12 into tight juxtaposition. This characteristic inhibits easily movement of the magnets which would permit fine adjustment of the quadrupole magnetic field within the aperture 15. To facilitate this a simple nonferrous frame (not shown) for example a brass clamp member 21 holds the media 13 and magnets 12 in relative position. In fact, it is preferred that some sort of frame be used when the media 13 and magnets 12 are permitted to be in tight juxtaposition in order to restrain their relative movement, which might occur because of vibrations or jarring during assembly or use.

Obviously the magnet material assembly may have another number of poles. In this specification multipole is intended to mean any even number of poles such as four, six or eight, that is practical.

I claim:

1. A magnet material quadrupole assembly for ionic beam transport, comprising four ferrous poles and four magnet material members defining an aperture in the assembly, said aperture being for ionic beam transport, said poles having said members juxtaposed therewith and oriented to have their polarities cooperate to produce a quadrupole field in said aperture, and wherein the improvement comprises each said members are composed of a plurality of elements of a material selected from the group barium ferrite and strontium ferrite.

2. The assembly of claim 1, wherein each of said element is a slab.

3. The assembly of claim 1, wherein each said element is a hexagonal cylinder.

4. The assembly of claim 1, wherein each said element is a circular cylinder.